United States Patent [19]

Johnston

[11] 4,231,342

[45] Nov. 4, 1980

[54] DIESEL FUEL HEAT RECOVERY SYSTEM AND CONTROL VALVE THEREFOR

[75] Inventor: William J. Johnston, Burton, Mich.

[73] Assignee: General Motors Corporation, Detroit, Mich.

[21] Appl. No.: 7,474

[22] Filed: Jan. 29, 1979

[51] Int. Cl.³ .................... F02M 53/00; F16K 24/02

[52] U.S. Cl. .............................. 123/557; 123/513.3; 123/543

[58] Field of Search .............. 123/122 H, 122 E, 136, 123/139 AB; 137/90, 881, 513.3, 569

[56] References Cited

U.S. PATENT DOCUMENTS

| | | | |
|---|---|---|---|
| 2,788,779 | 4/1957 | Meagelkamp | 123/122 E |
| 2,853,159 | 9/1958 | Kuhn | 137/513.3 |
| 3,107,079 | 10/1963 | Meddock | 137/513.3 |
| 3,626,968 | 12/1971 | Hancock | 137/513.3 |
| 3,768,454 | 10/1973 | Markland | 123/122 E |
| 3,986,486 | 9/1976 | Rabbiosi | 123/122 H |
| 4,040,404 | 8/1977 | Tagawa | 123/136 |

*Primary Examiner*—Charles J. Myhre
*Assistant Examiner*—Carl Stuart Miller
*Attorney, Agent, or Firm*—Arthur N. Krein

[57] ABSTRACT

A fuel heat recovery system and control valve therefor for use in the fuel system of a diesel engine wherein the fuel system includes a fuel tank connected by a supply conduit means, including at least one fuel filter and a fuel pump to the engine. The fuel pump is used to supply fuel at a predetermined pressure to a plurality of fuel injectors of the engine, the fuel injectors also being connected to a fuel return conduit whereby fuel supplied to the injectors in excess of that injected by the injectors can be returned to the fuel tank, this excess or surplus fuel normally being heated by the engine. A temperature responsive fuel flow control valve is connected to the fuel return conduit upstream of the fuel tank and to the supply conduit between the fuel tank and the fuel filter whereby to control the flow of the heated surplus fuel for flow either back to the supply tank or back to the engine as a function of the temperature of fuel being supplied to the engine.

3 Claims, 4 Drawing Figures

DIESEL FUEL HEAT RECOVERY SYSTEM AND CONTROL VALVE THEREFOR

This invention relates to fuel systems for diesel engines and, in particular, to a diesel fuel heat recovery system and control valve therefor for use in the fuel system of a diesel engine.

In a conventional diesel engine of the type having individual unit type fuel injectors for injecting fuel into the combustion chambers of the engine, the fuel system for the engine normally includes a fuel pump used to draw fuel from a fuel tank or reservoir for flow through a primary fuel filter. The fuel pump is operative to pressurize the fuel and deliver it via a secondary fuel filter to the injectors of the engines. As is conventional, the amount of fuel supplied to the injectors by the fuel pump is in excess of that actually injected by the injectors into the engine whereby excess or surplus fuel is thus provided which is used to effect cooling of the injectors. This excess fuel, which is thus heated during engine operation, is usually returned directly to the fuel tank for the engine.

It is well known that when diesel fuel is cooled, at or below certain low temperatures, paraffin wax crystals will solidify in the fuel. The temperature at which this occurs is normally in the range of −20° F. to +10° F., depending upon the grade of the fuel, which itself is determined in the refining process. This temperature is known as the cloud point. As the temperature is lowered below the cloud point, the wax crystals grow in size until the fuel becomes slushy, generally around −35° F.

When the cloud point is reached and the crystals begin to appear, fuel passing through a fuel filter will then cause the filter to plug and become highly restrictive, due to buildup of wax crystals on the filter media. Since as described above, a primary fuel filter is usually placed between the fuel tank and the inlet side of the fuel pump, only a small filter restriction can be tolerated.

Thus it will be apparent that when a diesel engine is first operated under low temperature operating conditions, as the fuel pump draws fuel from the fuel tank through the primary filter, these wax-like particles, then present in the fuel, will tend to clog the primary fuel filter to thereby restrict fuel flow therethrough. When the filter restriction becomes excessive, fuel pump cavitation will occur, and then the engine can be starved for fuel. The degree of fuel starvation can range from inability of the engine to produce maximum power to total engine stoppage.

Due to the large surface area of the filter, it will generally take several minutes for the filter to plug when the wax crystals are present. However, it is known that once the wax crystals have been collected by the filter, warming the filter will cause the wax crystals to melt and re-dissolve into the fuel.

The desirability of overcoming the problem of plugging of the fuel filter in a diesel engine fuel system has been recognized. Thus in order to overcome the above-described problem, it has been prosed to use various forms of electrical heaters to effect heating of the diesel fuel in the fuel reservoir or tank so that, in effect, these wax particles can again become fluid and re-dissolve in the fuel so as to then readily flow through the primary fuel filter.

It has also been proposed to utilize the heat of the diesel engine itself to effect heating of the fuel being supplied to the engine as another solution to the above-described problem. One system uses a heat exchanger to allow engine coolant to heat the fuel and another system uses engine exhaust heat to heat the fuel.

There is also disclosed in U.S. Pat. No. 3,768,454, entitled "Fuel Heater" issued Oct. 30, 1973 to Richard D. Markland, another system wherein a temperature responsive flow divider valve is positioned between the fuel tanks for the engine and the engine. In this system, the valve is responsive to the temperature of fuel being supplied to the engine by a feed line, wherein fuel from a primary fuel tank is mixed with heated fuel being returned from the injectors of the engine whereby the temperature of the fuel being supplied to the engine is controlled as a function of the valve. Specifically, in this system excess fuel supplied to the injectors of the engine and heated thereby is placed in fluid communication with the flow divider valve which is then operative to mix this heated return fuel with additional fuel being supplied to the engine or to return this excess fuel to a secondary fuel tank for mixing with the fuel contained therein before fuel from the secondary fuel tank can flow to the primary fuel tank that is used to supply fuel to the engine, all as a function of fuel temperature.

SUMMARY OF THE INVENTION

The present invention relates to an improved diesel fuel heat recovery system and to a control valve therefor whereby surplus fuel being delivered to the injectors of a diesel engine and heated thereby is returned via a temperature responsive fuel flow control valve which is operative to either return this heated fuel to the fuel tank for the engine or to mix it with fuel from the supply tank for return flow to the injectors of the engine as a function of fuel temperature.

It is therefore the primary object of the invention to provide an improved diesel fuel heat recovery system wherein a temperature responsive fuel flow control valve is used to control the flow of surplus heated fuel to either the fuel tank for the engine or to return this fuel directly to the injectors for the engine as a function of fuel temperature.

Another object of this invention is to provide a temperature responsive fuel flow control valve which is operative to control flow of heated fuel in a return conduit from the injectors of a diesel engine in accordance with the temperature of the fuel being supplied to the engine whereby the heated fuel is selectively either returned to the fuel tank or mixed with additional fuel and supplied to the engine.

A still further object of the invention is to provide a temperature responsive fuel flow control valve for use in the fuel system of a diesel engine whereby heated fuel being returned from the injectors of the engine can be used, as a function of fuel temperature, to heat the fuel being supplied to the engine.

For a better understanding of the invention as well as other objects and further features thereof, reference is had to the following detailed description of the invention to be read in connection with the accompanying drawings, wherein:

FIG. 1 is a schematic illustration of the fuel supply system for a diesel engine with a temperature responsive fuel flow control valve in accordance with the invention incorporated therein whereby to provide a diesel fuel heat recovery system for the engine;

FIG. 2 is a cross-sectional view in elevation of a preferred embodiment of a temperature responsive fuel flow control valve, per se, in accordance with the invention;

FIG. 3 is a cross-sectional view in elevation of an alternate embodiment temperature responsive fuel flow control valve in accordance with the invention; and, FIG. 4 is a cross-sectional view of one of the temperature responsive disc valve assemblies of the fuel flow control valve structure of FIG. 3.

BRIEF DESCRIPTION OF THE DRAWING

Referring now first to FIG. 1 there is shown a fuel system for a diesel engine of the type wherein a plurality of unit type fuel injectors, not shown, of known construction, are used to supply fuel to the associated cylinders of the engine for combustion therein.

As is conventional, such a fuel system normally includes a fuel reservoir or supply tank, a fuel pump, a primary fuel filter and a secondary fuel filter, the necessary manifold or piping from the secondary fuel filter to the injectors, not shown, of the engine and a return manifold or piping from the injectors to the supply tank.

Figure 1:
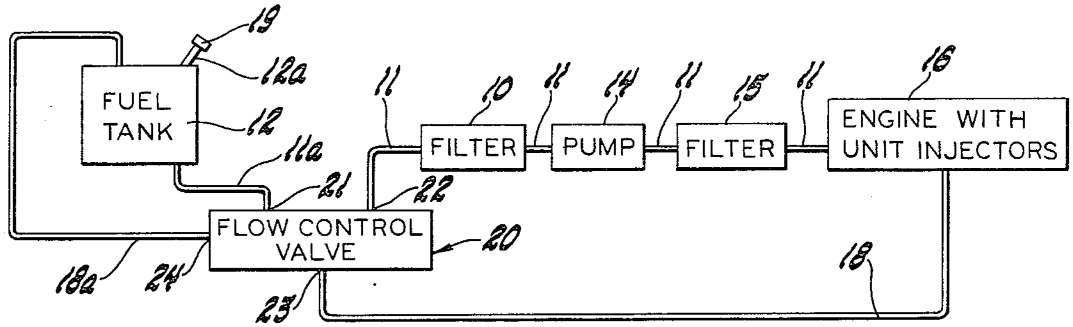

Thus in the system shown in FIG. 1, a primary fuel filter 10 is installed in the fuel supply conduit 11 for the engine. In the construction illustrated, the primary fuel filter 10 is connected to the supply conduit 11 between the supply tank 12 for the engine and the supply conduit 11 connection to the inlet of an engine driven fuel pump 14 whereby the fuel pump is operative to draw fuel from the supply tank through the primary filter. As shown, the secondary fuel filter 15 is connected to the supply conduit 11 connection from the outlet of the fuel pump and to the engine 16 whereby the pump forces fuel flow through the secondary fuel filter 15. From the secondary fuel filter 15, the fuel oil is forced through an inlet manifold, not shown, to the individual fuel injectors, not shown, of the engine 16.

The capacity of the fuel supply pump 14 is considerably in excess for that required for engine operation. As is well known, the unit fuel injectors, not shown, are constructed so as to allow the surplus fuel to flow through them so that this surplus fuel serves as a coolant. This surplus fuel is thereby heated, of course, during engine operation. In addition to serving as a coolant, circulation of the surplus fuel bleeds any air or vapor which forms within the fuel system back to the fuel supply tank 12.

Surplus fuel leaving the injectors flows through the outlet pipe, not shown, from each injector to a return manifold, not shown, and then through a fuel return conduit 18. Normally the fuel return conduit 18 would be connected to the fuel supply tank 12 whereby this surplus heated fuel would be returned directly to the fuel tank 12. As is conventional, fuel tank 12 is provided with a suitable cap 19 secured to the filter neck 12*a*, of the tank. As is conventional the cap 19 is provided with a vent valve, not shown, whereby the pressure in the interior of the tank is normally at atmospheric. Also, as well known, a restriction, not shown, is used to provide sufficient resistence to the flow of the fuel so as to build up a pressure, for example, 40 to 50 pounds (approximately) throughout the fuel system downstream of the fuel pump 14 at, for example, 1200 engine rpm.

As is well known, the primary fuel filter 10 in such a fuel system illustrated is either located as shown, or it can alternately be located between the fuel pump 14 and the secondary fuel filter 15. Obviously, in this latter arrangement the fuel would then be forced through the primary fuel filter 10 under pressure, rather than being drawn through under a partial vacuum as in the system shown.

In accordance with the invention, a temperature responsive fuel flow control valve generally designated 20, is connected, in a manner to be described in greater detail hereinafter, into the previously described fuel system whereby to provide the diesel fuel heat recovery system of the engine.

As shown schematically in FIG. 1, the control valve has a fuel inlet port 21 and a fuel supply port 22 whereby this control valve is connectable to the supply conduit 11 intermediate of the fuel tank 12 and the primary fuel filter 10, with reference to the construction shown. In addition this control valve 20 has a fuel return port 23 and a return discharge port 24 whereby this valve is also connectable to the fuel return conduit 18 intermediate the engine 16 and the fuel tank 12.

Figure 2:
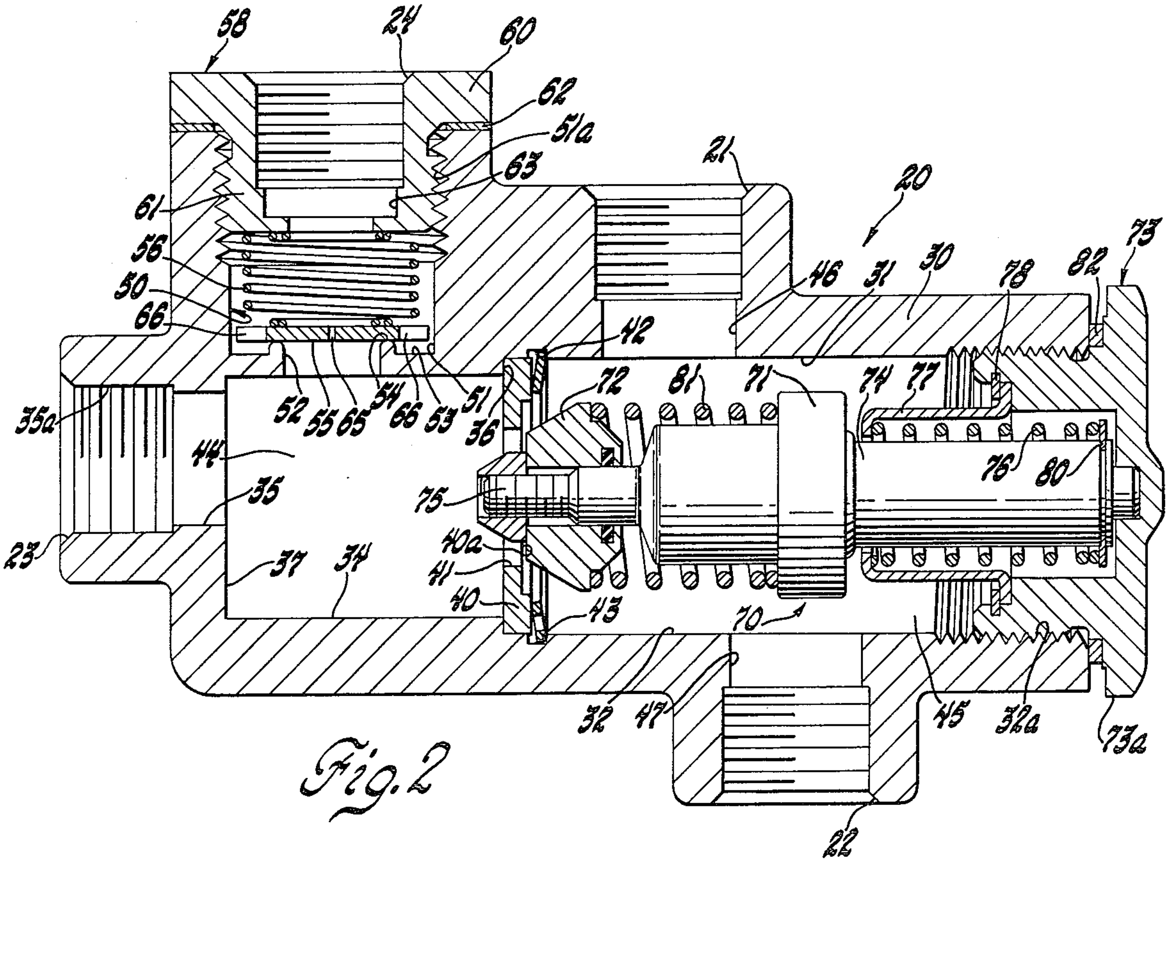

Referring now to the temperature responsive fuel flow control valve, per se, this valve 20, in the embodiment shown in FIG. 2, includes a valve housing 30 having an axial off-set stepped bore 31 extending horizonally therethrough with reference to this Figure. The stepped bore 31 defines, in succession, starting from the right hand of the housing with reference to FIG. 2, an inner cylindrical wall 32 having internal threads 32*a* at its free or right hand end with reference to FIG. 2, an inner cylindrical intermediate wall 34 and an inner cylindrical end wall 35 with internal threads 35*a* at its free end. The inner cylindrical end wall 35 defines a fuel return passage that terminates at a fuel return port 23. Walls 32 and 34 are interconnected by a flat radial shoulder 36. Walls 34 and 35 are interconnected by a flat shoulder 37. Walls 35 and 34 are of progressively reduced diameters relative to wall 32.

An annular valve seat disc 40, having a central aperture port passage 41 therethough, is slidably received by the wall 32 and is positioned so as to abut on one side thereof against the shoulder 36 whereby this valve seat disc 40 is axially positioned within the housing against movement in one direction thereby. The valve seat disc 40 is axially retained against movement in the opposite direction by a bowed split-ring retainer 42 that is positioned in an annular groove 43 provided for this purpose in the wall 32 closely adjacent to the shoulder 36 but axially spaced therefrom a suitable distance to accommodate the valve seat disc 40 therebetween.

The valve seat disc 40 is thus positioned, defines with the wall 34 and the shoulder 37 a fuel return chamber 44 and defines with the wall 32 and a closure plug 73, described in further detail hereinafter, a mixing chamber 45.

Housing 30 is also provided with a threaded bore shown formed at right angles to bore 31 in the construction illustrated so as to define a fuel inlet passage 46 that has one end thereof opening into the mixing chamber 45 and which terminates at its outer end in a fuel inlet port 21 for connection by a branch conduit 11*a* of the supply conduit 11 to the fuel tank 12 for receiving fuel therefrom.

Housing 30 is further provided with a threaded bore, preferably located diametrically opposite and axially off-set from the bore defining the inlet passage 46, which bore defines a fuel supply passage 47 that opens at its inner end from the mixing chamber 45 and which terminates at its other end in the fuel supply port 22 for connection by the supply conduit 11 to the fuel injectors for the engine 16, in the manner described, for supplying fuel thereto.

The housing 30 at its opposite upper end, with reference to FIG. 2, is provided with a counter sunk bore 50, also shown located at right angles to the bore 31. Bore 50 defines, in succession, starting from the upper surface of the housing 30, a cylindrical inner wall 51 having internal threads 51*a* at its upper end, and a cylindrical wall 52 of reduced diameter relative to wall 51 which defines a fuel return passage that opens at its lower end into the fuel return chamber 44. Walls 51 and 52 are interconnected by a flat radial shoulder 53 that extends radially inward from wall 51 to terminate at a raised annular valve seat 54 which encircles the wall 52 defining a portion of the fuel return passage.

A valve disc 55 of a suitable diameter smaller than the inside diameter of the wall 51 is operatively positioned therein for movement between a position at which it is in seated engagement against the valve seat 54 and an open position at which it is raised off the valve seat. The valve disc 55 is normally biased into seating engagement against the valve seat 54 by a compression spring 56. Spring 56 is positioned so as to abut at one end against the valve disc 55 and to have its other end abut against the lower face of a conduit coupling adapter 58.

As shown the conduit coupling adapter 58 is provided with an external wrenching head 60 with a shank 61 depending thereof. The shank 61 is provided with external threads engaging the internal threads 51*a* of wall 51. A suitable gasket 62 is sandwiched between the hex head 60 of the conduit coupling adapter 58 and the raised upper surface portion 30*a* of the housing 30 encircling wall 51. The conduit coupling adapter 58 is provided with an axially extending internally threaded stepped bore 63 therethrough that opens at one end into a spring chamber defined in part by the lower portion of wall 51 and the upper surface of the valve disc 55. The opposite upper end of the bore 63 defining the fuel return discharge port 24 used for connection by the branch conduit 18*a* of the return conduit 18 to the fuel tank 12 whereby fuel is returned to the fuel tank.

The valve disc 55 is provided with a vapor orifice passage 65 therethrough of predetermined diameter whereby any fuel vapors present in the mixing chamber 44 can be bled by this orifice passage 65 back to the fuel tank 12. In addition, the valve disc 55 preferably is also provided with a plurality of circumferentially spaced apart notches 66, each such notch 66 extending radially inward from the outer peripheral edge of the valve disc 55 whereby to provide a flow passage defined in part by the notch 66 and an associated adjacent portion of the wall 51. Only two such notches 66 are shown in FIG. 2.

The force of the spring 56 can be preselected, as desired, whereby the valve disc 55 will be moved to its open or unseated position relative the valve seat 54 when the pressure differential thereacross is, for example, 5 psi or greater. Since the pressure of fuel in the fuel tank 12 is normally at atmospheric pressure, this valve disc 55 would then be operative whereby to maintain the pressure in the fuel return chamber 44 from exceeding 5 psi during engine operation.

Flow from the fuel return chamber 44 to the mixing chamber 45 via the port passage 41 is controlled by a temperature actuated valve or thermo valve, generally designated 70, which includes a thermostatic power device 71 used to effect movement of a valve 72 of this assembly as a function of fluid temperature within the mixing chamber 45, between a closed position and an open position relative to the valve seat 40*a* encircling the port passage 41.

The thermo valve 70, including both the thermostatic power device 71 and the thermo valve 72, with respect to which no novelty, per se, is claimed may be of any suitable type. In the construction illustrated in FIG. 2, the thermo valve 70, including both the thermostatic power device 71 and the valve 72, is of a type that is commercially available, for example, from the Scovill Manufacturing Company, Vernatherm Products Dept., Waterbury, Connecticut.

Although a detailed description of the thermo valve 70 is not deemed necessary for an understanding of the subject invention, a brief description of this device is deemed appropriate. Thus, in the construction shown, the thermostatic power device 71 of the thermo valve 70 has a mounting in the counter bored end of the closure plug 73, that in effect forms a part of the thermo valve 70, as is well known.

The thermostatic power device 71 includes a temperature responsive material, not shown, in the casing assembly 74 of the device that is operative to effect axial movement of the stem 75 on which the valve 72 is operatively secured. A spring 76 operatively abuts at one end against a spring retainer 77, suitably fixed as by a retainer ring 78 to the closure plug 73, and at its other end abuts against a retainer 80 operatively fixed to the casing assembly 74. Spring 76 provides a force to return the usual piston of the thermostatic power device 71 to its original position during a cooling cycle.

Another spring 81 is operatively positioned in abutment at one end against the valve 72 and at its opposite end against a suitable portion of the casing assembly 74 whereby to provide a pressure release feature, as well as providing an overall function that allows the thermostatic power device 71 to move relative to the valve 72 when seated, as the temperature of fluid in thermal contact with the temperature responsive material in the thermostatic power device 71 continues to rise. A suitable gasket washer 82 is sealing sandwiched between the head 73*a* of the closure plug 73 and the end of the valve housing 30.

As shown, the thermostatic power device 71 is thus suitably positioned within the mixing chamber 45 so as to be in thermal heat exchange relationship with the fluid therein and thus, in effect, senses the temperature of the fuel being supplied to the engine.

During engine operation, as surplus fuel is returned from injectors of the engine 16 by the return conduit 18 into the fuel return chamber 44, the check valve therein, in the form of the valve disc 55, is then operative to regulate the pressure in the fuel return chamber 44 and therefor in the return conduit 18, to some predetermined pressure as determined by the force of the compression spring 56. This pressure within the fuel return chamber 44 is then operative to effect forced fuel flow through the port passage 41, as controlled by valve 72 into the mixing chamber 45, with fuel from this mixing chamber then flowing to the engine 16. As the pressure in the fuel system between the pump 14 and the restriction, not shown, in the outlet of the return manifold, not shown, is relatively high the reduced pressure in the return conduit 18 and in the fuel return chamber 44 will not have an adverse effect on the fuel system.

Now assuming that the operating temperature is below some prescribed limit, during engine operation the fuel returning via the return conduit 18 into the return chamber 44 will be heated fuel. At this time, the temperature of the fuel in the mixing chamber 45 would also be below a prescribed limit.

Thus when the fuel within the mixing chamber 45 is below a prescribed limit, the fuel in this mixing chamber will then be operative to actuate the thermostatic power device 71 and the valve 72 thereof in an opening direction relative to the valve seat 40*a* whereby to allow fuel flow from the fuel return chamber 44 to the mixing chamber 45. At the same time, fuel is also being drawn from the fuel tank 12 into the mixing chamber 45 due to the operation of the pump 14, to mix with the heated fuel flowing from the fuel return chamber 44. This fuel mixture is then used to actuate the thermostatic power device 71.

Thus, when the fuel mixture within the mixing chamber 45 is below prescribed limits, the thermostatic power device 71 moves the valve 72 in a direction to allow more return fuel to flow from the fuel return chamber 44 to the mixing chamber 45, which increases the mixing temperature of the fuel then being delivered to the engine. It will be apparent that since the returning excess heated fuel is under pressure, as determined by the force of spring 56, it will flow into the mixing chamber 45 in preference to the flow of cold fuel from the fuel tank 12. Under this condition, the only fuel flowing from the fuel tank 12 is that needed to supply the amount burned by the engine 16.

When the fuel mixture temperature is above prescribed limits, less return fuel flow is allowed to flow from the return chamber 44 into the mixing chamber 45. In either case, some of the excess fuel will flow through the return passage 52 to the fuel tank 12 for mixing with the fuel therein, the fresh fuel will be drawn from the fuel tank 12 into the mixing chamber 45 as needed.

It was found in operation of the control valve 20 of FIG. 2 in a particular fuel system that, during the first 10 minutes of engine operation, the temperature of the fuel flowing through the primary fuel filter 10 was only slightly cooler than the temperature of the excess heated fuel being returned via the return conduit 18. This indicated that nearly 100% of this surplus fuel being returned via the return conduit 18 was being recirculated back to the injectors of the engine 16. After this time period, the thermostatic power device 71 was operative to begin effecting closing movement of the valve 72 relative to the valve seat 40*a* whereby to reduce the amount of excess heated fuel flowing into the mixing chamber 45. With this arrangement, the fuel flowing to the engine 16 was then maintained approximately mid-way the cloud point and the oxidation temperature for the particular fuel being used.

Figure 3:
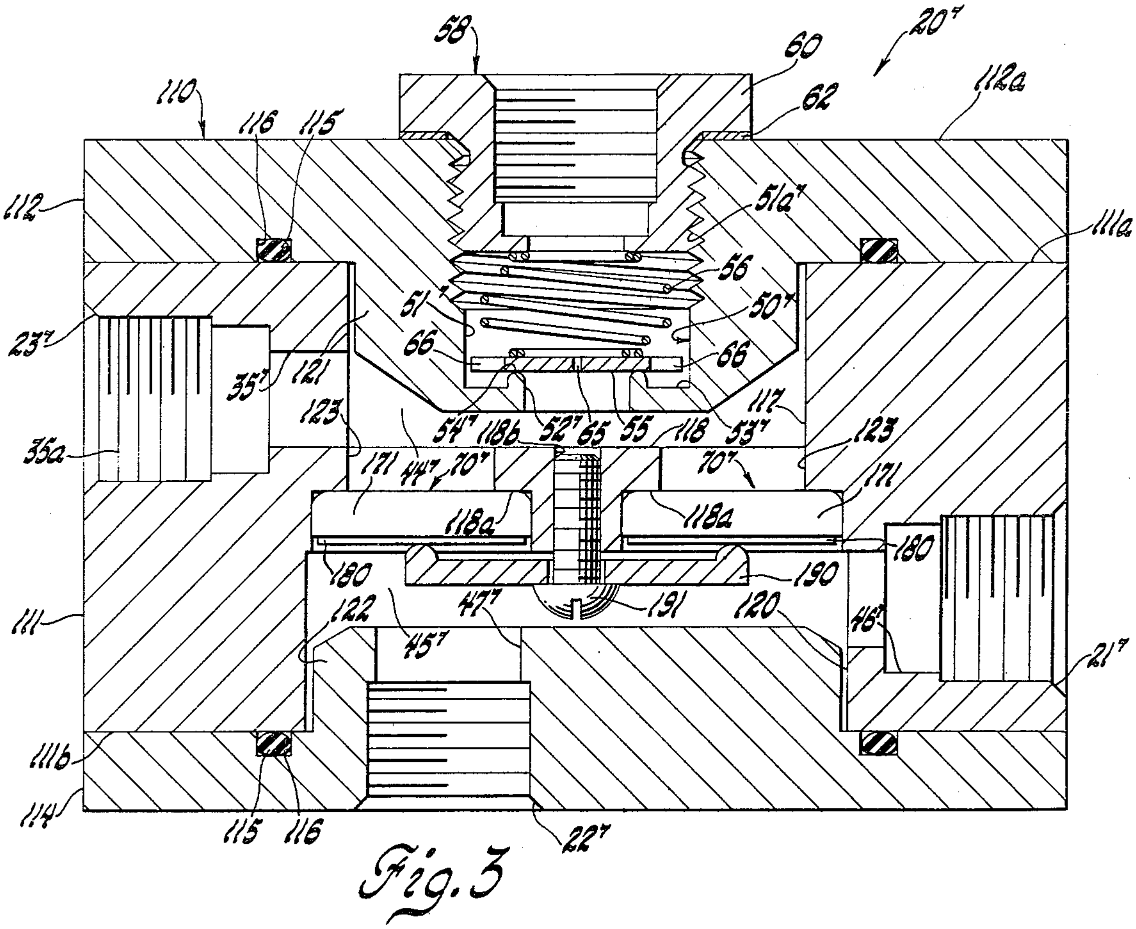

An alternate embodiment of a temperature responsive fuel flow control valve, generally designated 20', in accordance with the invention is shown in FIG. 3 wherein similar parts are designated by similar numerals but with the addition of a prime (') where appropriate.

In the construction shown, the temperature responsive flow control valve 20' assembly includes a three piece circular housing 110 that is made up of a valve body 111, an upper cover 112 and lower cover 114 suitably secured together in a unit housing assembly. For example, screw bolts, not shown, can be used to extend down through suitable apertures within the cover 112 and body 111 for threaded engagement in correspondingly located internally threaded apertures, not shown, provided for this purpose in the lower cover 114. Suitable seals, such as O-ring seals 115 are sealingly sandwiched between the upper cover 112 and the body 111 and, between the body 111 and lower cover 114, with suitable annular grooves 116 being provided, for example, in both the upper and lower covers to receive the O-ring seals 115.

In the particular construction illustrated, the body 111 is provided with a blind bore extending from its upper surface 111*a* to define an internal upper cylindrical wall 117 that terminates at its lower end one side of a central circular, disc-like web 118 in the body 111. The body 111 is also provided with a blind bore extending from its lower surface 111*b* to define an internal cylindrical lower wall 120 that terminates at its upper end at the opposite side of the web 118.

A central depending chamfered boss 121 of the upper cover 112 is of an external diameter so as to be slidably received by upper wall 117 whereby to define with the lower portion of this upper wall and the upper surface of web 118 a fuel return chamber 44'.

In a similar manner, a central upstanding chamfered boss 122 of lower cover 114 is slidably received by lower wall 120 to define with the upper portion of this lower wall and the lower surface of web 118 a fuel mixing chamber 45'.

Body 111 is also provided with a stepped bore extending from the outer peripheral side surface thereof, the left hand side as seen in FIG. 3, that extends through the wall 117, to provide a cylindrical internal wall 35' defining a fuel return passage into the return chamber 44'. Internal wall 35' terminates at a fuel return port 23'. The internal wall 35' is provided with internal threads 35*a'* adjacent to the fuel return port 23' for connection to a return conduit 18. Body 111 is further provided with a stepped bore, with internal threads at one end thereof to define a fuel inlet passage 46' with the inlet port 21' at one end thereof for connection by a branch conduit 11*a* of the supply conduit 11 to the fuel tank 12. As shown, this fuel inlet passage 46' is located so that one end thereof opens into the fuel mixing chamber 45'.

Lower cover 114 is provided with a threaded bore which defines a fuel supply passage 47' that opens at its inner end from the mixing chamber 45' and terminates at its other end in the fuel supply port 22' for connection by the supply conduit 11 to the fuel injectors for the engine 16 whereby fuel can be supplied to these injectors.

The upper cover 112 is provided with a counter sunk stepped bore 50' to define, in succession, starting from the upper surface 112*a* of the upper cover 112, a cylindrical inner wall 51' having internal threads 51*a'* at its upper end, a cylindrical wall 52' of reduced diameter relative to wall 51' which defines a fuel return passage that opens at its lower end into the fuel return chamber 44'. Walls 51' and 52' are interconnected by a flat radial shoulder 53' that extends radially inward from wall 51' to terminate at a raised annular valve seats 54' which encircles the wall 52' defining a portion of the fuel return passage.

A valve disc 55 is slidably received within the chamber defined by the wall 51' and is adapted for movement between a position at which it is in seated engagement against the valve seat 54' and an open position at which it is raised off the valve seat. Valve disc 55 is normally biased into seating engagement against the valve seat 54' by a compressing spring 56. As shown, the spring 56 is operatively positioned between the valve disc 55 and the conduit coupling adapter 58 threadingly received in the threaded portion of wall 51'. A suitable gasket 62 is sandwiched between the hex head 60 of the conduit coupling adapter 58 and the upper surface 112*a* of the upper cover 112.

Valve disc 55 is also provided with a vapor orifice passage 65 therethrough which is of predetermined diameter to permit the flow of fuel vapors therethrough while restricting the flow of liquid fuel therethrough. Notches 66 provided in the valve disc 55 permit free flow of fuel from the return chamber 44' when the valve disc 55 is in an open position relative to valve seat 54'.

In the construction illustrated, the web 118 in the body 111 is provided with a pair of stepped through bore passages 123 therethrough to provide flow passages from the fuel return chamber 44' to the mixing chamber 45'. Each of these passages 123 is of a predetermined internal diameter at one end, the lower end with reference to FIG. 3, whereby to receive a thermovalve, generally designated 70' therein for controlling fuel flow therethrough from the fuel return chamber 44' to the mixing chamber 45'.

Figure 4:
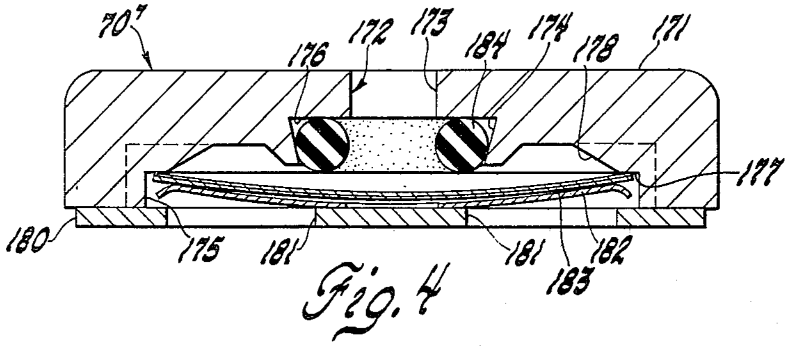

Each such thermovalve 70', as best seen in FIG. 4, includes a circular disc like valve body 171 having an axial extending stepped bore 172 therethrough to define, starting from its upper surface with reference to the drawings an annular internal wall 173 defining a port passage, a radially inward inclined cylindrical intermediate wall 174 and an internal cylindrical end wall 175 that terminates at the lower face of the valve body. Walls 175 and 174 are of progressively larger diameters then the diameter of wall 173. Walls 173 and 174 are interconnected by a flat shoulder 176. Walls 174 and 175 are interconnected by a flat shoulder 177. The valve body has also incorporated therein a plurality of radial slots 178 formed in the wall 175 and the flat shoulder 177.

A circular disc like cover 180 having circumferentially spaced apart port openings 181 is positioned to abut against the lower surface of the valve body 171 for operatively retaining a circular spring 182 in the chamber defined between the wall 175, shoulder 177, including the radial slots therein, and the cover 180. The circular spring 182 is used to retain a snap disc valve 183, in the form of a heat responsive bimetal element.

The snap disc valve 183 in the position shown in FIG. 4, is formed so as to be in its open position, a cold position, wherein the bimetal element is normally flexed or prestressed into the position shown wherein it is out of sealing engagement with an O-ring valve seat 184. The O-ring valve seat 184 is positioned within the wall 174 in abutment at one end against the flat shoulder 176. As is well known, the bimetal snap disc valve 183 when heated to a predetermined elevated temperature is operative to flex or bend in the opposite direction so that it would then abut in sealing engagement against the O-ring valve seat 184, to thereby block fluid flow through the port 173.

Again referring to FIG. 3, each thermovalve 70' is positioned in its associated passage 123 so as to abut at one end against an internal flat shoulder 118*a* of the web 118 and is axially retained thereagainst by means of a rectangular shaped, valve holder bracket 190 that is secured as by means of a threaded screw 191 threadingly received in a centrally internally threaded aperture 118*b* in the web 118.

As shown in FIG. 3, each thermovalve 70' is positioned within the body 111 so that the port 173 in the valve body 171 will open into the fuel return chamber 44' while the apertures 181 through cover 180 are in fluid communication with the mixing chamber 45'. With this placement of the thermovalves 70' in the body 111, the fuel in the mixing chamber 45, including cold fuel received from the fuel tank will be in thermal heat exchange relationship with the bottom of each of the thermovalves 70' while the upper portion of the thermovalves 70' will be in thermal heat exchange relationship with the fuel being returned to the fuel return chamber 44' via the fuel return conduit 18.

If both these temperatures are below a preselected value for the bimetallic disc valves 183, in the thermovalve 70', the snap disc valve therein will snap in an open direction, to the position shown, and allow 100% recirculation of the warm fuel from the fuel return chamber 44' to flow via the fuel mixing chamber 45' to the engine. If on the other hand, both temperatures, that is both the temperature of the fuel in the fuel return chamber 44' and in the mixing chamber 45' are above a predetermined desired temperature, the bimetallic snap disc valve 183 will snap close and allow no recirculation of the heated return fuel.

If the warm fuel returning via fuel return conduit 18 into the fuel return chamber 44' is above the desired value, but the cold fuel from the fuel tank together with the fuel in the mixing chamber 45' is below the desired value, the bimetallic snap disc valve 183 will open, allowing warm fuel to flow through each thermovalve into the mixing chamber 45' to warm the thermovalves and to raise the temperature of the fuel in the mixing chamber 45'. When each of these bimetallic snap disc valves 183 are warm, they will again snap close until cooled by the cold fuel flowing through the mixing chamber 45' and the above process will then be repeated. This opening and closing cycling of the thermovalves 70' will be operative to modulate the temperature of the fuel flowing to the engine via the primary fuel filter.

The embodiments of the invention in which an exclusive property or privilege is claimed are defined as follows:

1. A temperature responsive fuel flow control valve for use in a diesel engine fuel system of the type having a fuel tank connected by a supply conduit and a fuel filter to the inlet of a fuel pump used to supply fuel to a plurality of fuel injectors mounted on the engine, the injectors being connected to a fuel return conduit whereby excess fuel supplied to the injectors and heated by the engine is returned to the fuel tank, said flow control valve including a housing defining a fuel return chamber and a mixing chamber interconnected by a port passage, said housing having an inlet passage opening at one end into said mixing chamber and connectable at its opposite end to the supply conduit intermediate the ends thereof with the fuel tank downstream thereof whereby fuel from the fuel tank can flow into said mixing chamber; a fuel supply passage in said housing opening at one end into said mixing chamber and being connectable at its opposite end to the supply conduit intermediate the ends thereof with the fuel filter upstream thereof; said housing further having a fuel return passage opening into said fuel return chamber and a discharge passage from said fuel return chamber, said fuel return passage being connectable to the return conduit whereby excess fuel being returned from the injectors will flow into said fuel return chamber, said fuel return discharge passage being connectable to the fuel tank for the discharge of fuel thereto; a spring biased, pressure responsive valve, with a vapor vent passage therethrough, operatively positioned in said fuel return discharge passage and in continuous communication with the fuel in the fuel return chamber for controlling the pressure of fuel in said chamber, and a thermostat valve positioned in said mixing chamber in heat exchange relationship with the fuel therein for controlling flow of fuel from said fuel return chamber through said port passage into said mixing chamber as a function of the temperature of the fuel in said mixing chamber.

2. A temperature responsive fuel flow control valve for use in a diesel engine fuel system of the type having a fuel tank connected by a supply conduit with a fuel filter to the inlet of a fuel pump which is used to supply pressurized fuel to a plurality of fuel injectors mounted on the engine, the injectors being connected to a fuel return conduit whereby excess fuel supplied to the injectors by the fuel pump and heated by the engine is returned to the fuel tank; said flow control valve including a housing means defining a fuel return chamber and a mixing chamber interconnected by at least one port passage, said housing having an inlet passage and a supply passage each opening at one end into said mixing chamber with said inlet passage being connectable at its opposite end to the supply conduit intermediate the ends thereof with the fuel tank downstream thereof whereby fuel from the fuel tank can flow into said mixing chamber and with said supply passage being connectable at its opposite end to the supply conduit intermediate the ends thereof with the fuel pump upstream thereof; said housing further having a fuel return passage opening into said fuel return chamber and a discharge passage from said fuel return chamber, said fuel return passage being connectable to the return conduit whereby excess fuel being returned from the injectors will flow into said fuel return chamber, said fuel return discharge passage being connectable to the fuel tank for the discharge of fuel thereto; a pressure responsive valve, with a vapor vent passage therethrough, operatively positioned in said fuel return discharge passage and in continous communication with the fuel in the fuel return chamber for controlling the pressure of fuel in said chamber; and, at least one thermostat valve operatively associated with said at least one port passage and positioned to be in heat exchange relationship with the fuel in said mixing chamber whereby said thermostat valve is operative to control flow of fuel from said fuel return chamber through the associated said at least one port passage into said mixing chamber as a function of the temperature of the fuel in said mixing chamber.

3. A temperature responsive fuel flow control valve for use in a diesel engine fuel system of the type having a fuel tank connected by a supply conduit and a fuel filter to the inlet of a fuel pump used to supply fuel at a predetermined pressure to a plurality of fuel injectors mounted on the engine, the injectors being connected to a fuel return conduit whereby excess fuel supplied to the injectors and heated by the engine is returned to the fuel tank; said flow control valve including a housing defining a fuel return chamber and a mixing chamber interconnected by a port passage means, said housing having an inlet passage and a fuel supply passage each opening at one end into said mixing chamber and each being connectable at its opposite end to the supply conduit intermediate the ends thereof with the fuel tank downstream of said inlet passage and with the fuel pump upstream of said fuel supply passage; said housing further having a fuel return passage opening into said fuel return chamber and a discharge passage from said fuel return chamber, said fuel return passage being connectable to the return conduit whereby excess fuel being returned from the injectors will flow into said fuel return chamber, said discharge passage being connectable to the fuel tank for the discharge of fuel thereto; a pressure responsive valve, with a vapor vent passage therethrough, operatively positioned in said discharge passage and in continuous communication with the fuel in the fuel return chamber for controlling the pressure of fuel in said chamber; and, thermostat valve means positioned to control flow through said port passage means, said thermostat valve means being operatively positioned in heat exchange relationship with the fuel in said mixing chamber whereby said thermostat valve means is operative to control flow of fuel from said fuel return chamber through said port passage means into said mixing chamber as a function of the temperature of the fuel in said mixing chamber.

* * * * *